(12) United States Patent
Luo

(10) Patent No.: US 9,810,400 B2
(45) Date of Patent: Nov. 7, 2017

(54) ADJUSTABLE REFLECTOR DEVICE FOR LIGHT FIXTURES

(71) Applicant: SINOWELL (SHANGHAI) CO., LTD., Shanghai (CN)

(72) Inventor: Jia Luo, Shanghai (CN)

(73) Assignee: Sinowell (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/255,955

(22) Filed: Sep. 2, 2016

(65) Prior Publication Data
US 2017/0067617 A1    Mar. 9, 2017

Related U.S. Application Data

(63) Continuation of application No. PCT/CN2016/096444, filed on Aug. 23, 2016.

(30) Foreign Application Priority Data

Sep. 9, 2015   (CN) .................... 2015 2 0693145 U

(51) Int. Cl.
| F21S 4/00 | (2016.01) |
| F21V 7/16 | (2006.01) |
| F21S 8/04 | (2006.01) |
| F21V 7/00 | (2006.01) |
| A01G 9/26 | (2006.01) |
| F21V 17/02 | (2006.01) |
| F21Y 103/00 | (2016.01) |

(52) U.S. Cl.
CPC ................. *F21V 7/16* (2013.01); *A01G 9/26* (2013.01); *F21S 8/04* (2013.01); *F21V 7/005* (2013.01); *F21V 17/02* (2013.01); *F21Y 2103/00* (2013.01)

(58) Field of Classification Search
CPC ... F21V 7/16; F21V 7/005; F21V 7/18; F21V 17/02; A01G 7/045; A01G 9/20; F21S 8/04
USPC ........................................................ 362/220
See application file for complete search history.

(56) References Cited

FOREIGN PATENT DOCUMENTS

| CN | 86102474 A | 11/1986 |
| CN | 1236078 A | 11/1999 |
| CN | 201416840 Y | 3/2010 |
| CN | 201487675 U | 5/2010 |

(Continued)

OTHER PUBLICATIONS

International Search Report and Written Opinion of the International Searching Authority for International Patent Application No. PCT/CN2016/096444 dated Nov. 29, 2016, 11 pages.

*Primary Examiner* — Andrew Coughlin
*Assistant Examiner* — Meghan Ulanday
(74) *Attorney, Agent, or Firm* — Alston & Bird LLP

(57) ABSTRACT

An adjustable reflector device for light fixtures is disclosed. The device comprises a reflector sheet made of a resiliently flexible material with at least one reflective surface folded and flexed along two parallel pivot axes into a concave arrangement of one central section and two flexible wings behind a high-intensity discharge lamp, such that the degree of concavity of the reflector can be adjusted to a plurality of predetermined degrees relative to the lamp by flexing or bending the wings radially around the pivot axes without the use of tools, thereby allowing horticulturists in the field to adjust the geometry of the light beam emitted in order to provide plants positioned below the fixture with a uniform pattern of light radiation of different intensities as needed at different stages of plant growth.

13 Claims, 19 Drawing Sheets

(56) References Cited

FOREIGN PATENT DOCUMENTS

| | | |
|---|---|---|
| CN | 202338801 U | 7/2012 |
| CN | 103038571 A | 4/2013 |
| CN | 103712088 A | 4/2014 |
| CN | 204300900 U | 4/2015 |
| CN | 204372586 U | 6/2015 |
| CN | 204879611 U | 12/2015 |
| EP | 1925878 A1 | 5/2008 |
| FR | 3023355 A1 | 1/2016 |

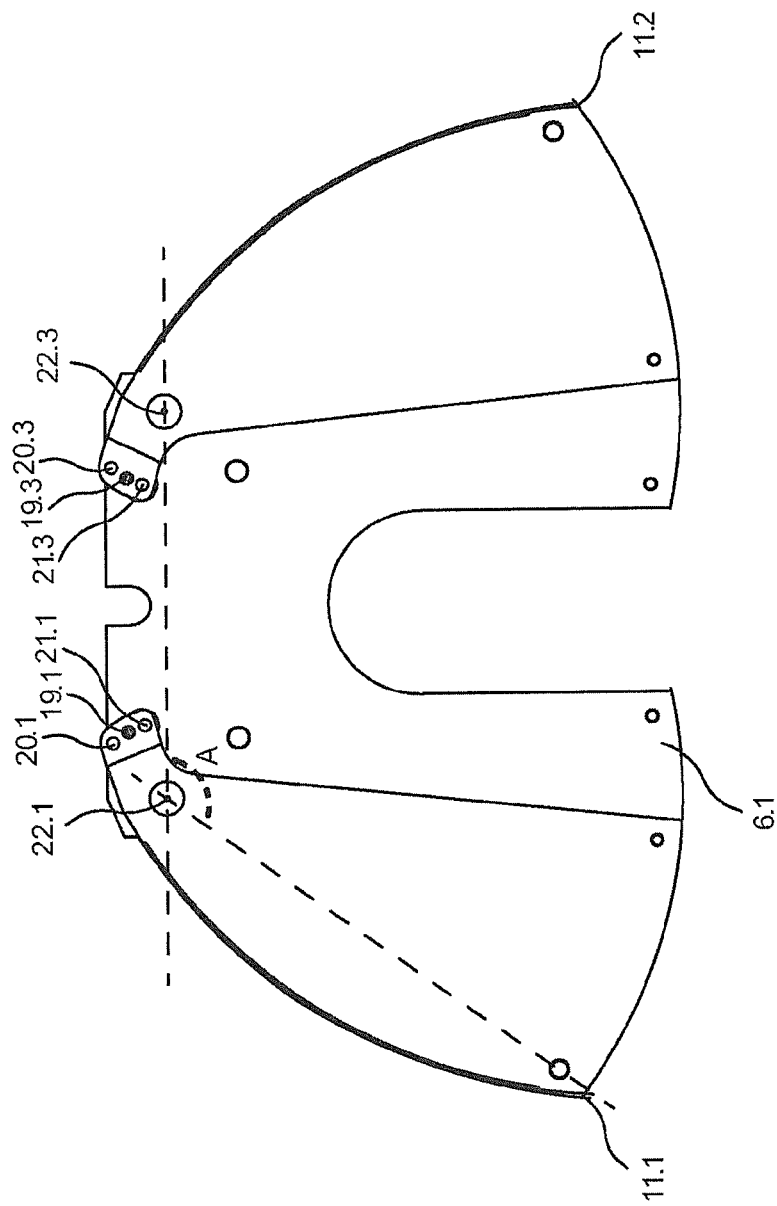

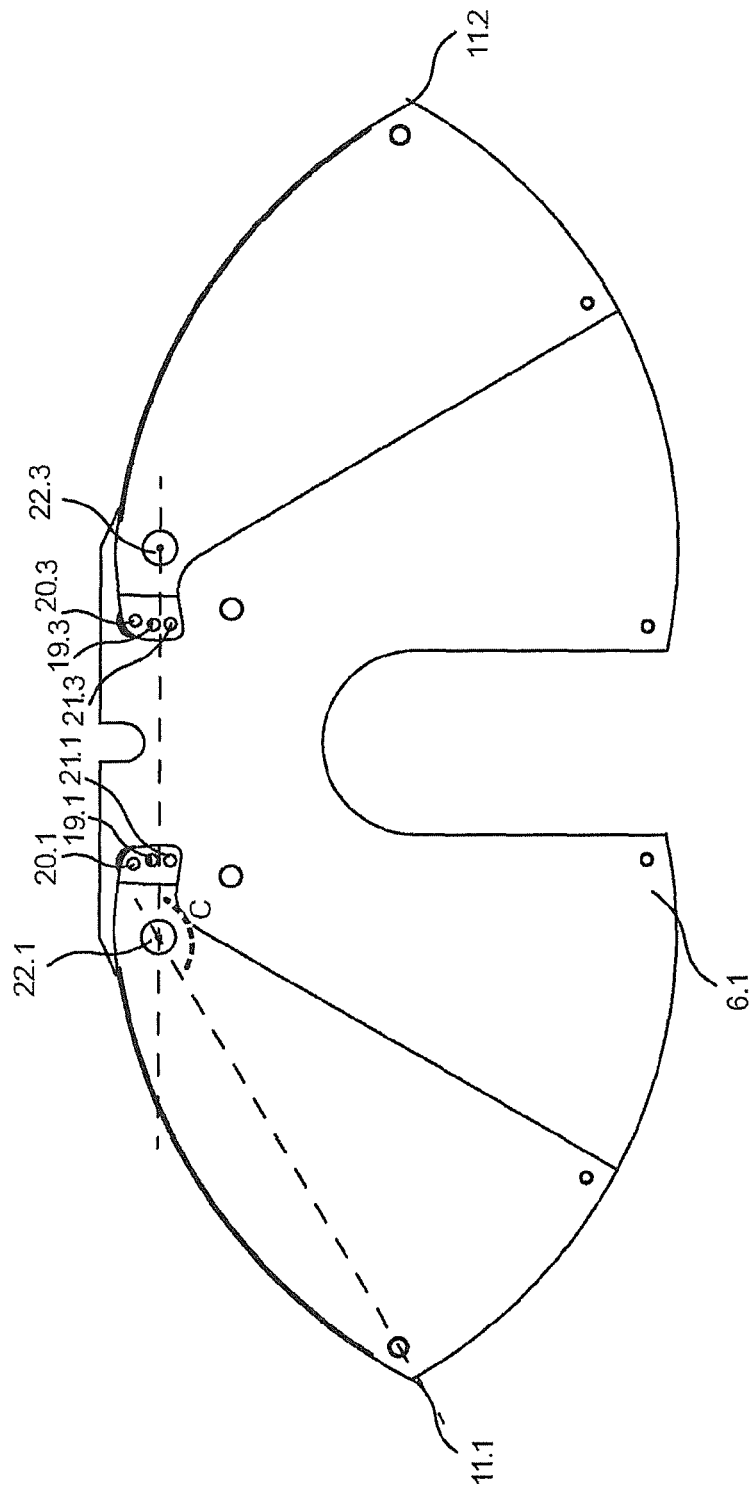

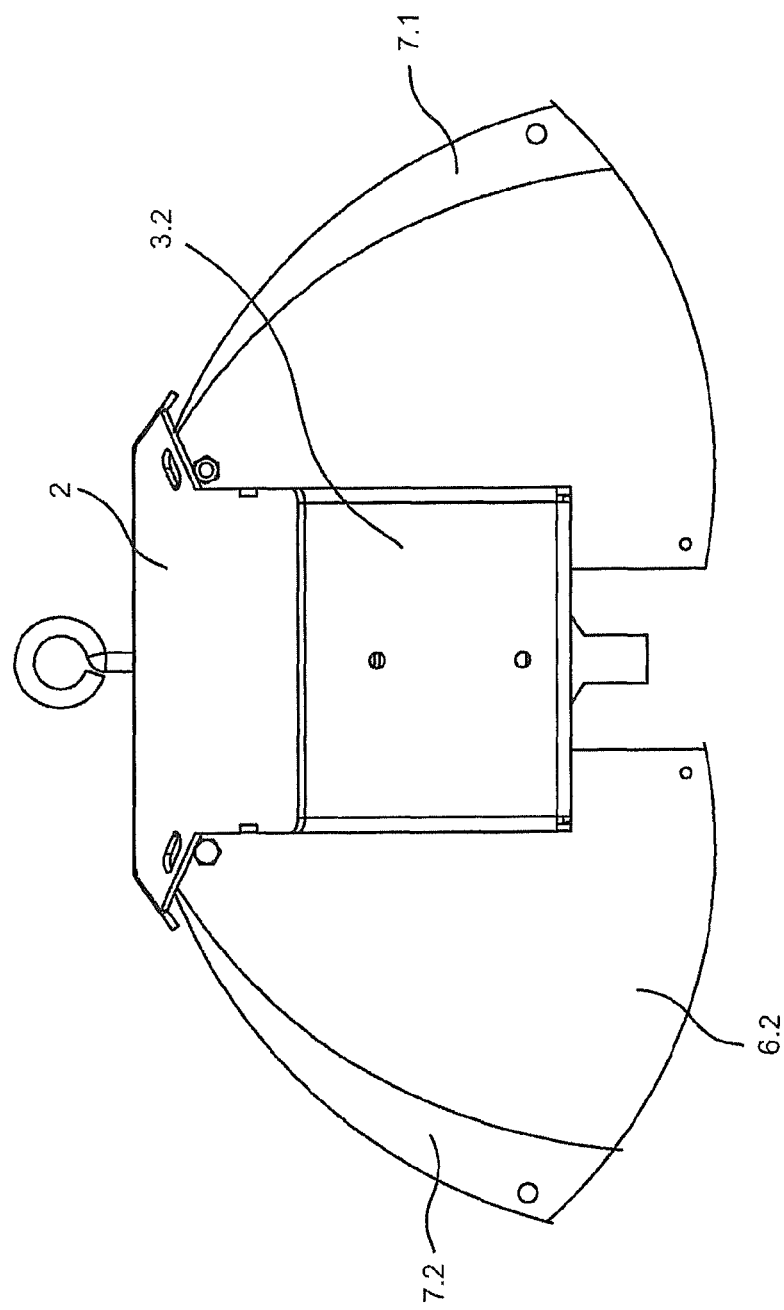

ADJUSTABLE REFLECTOR DEVICE FOR LIGHT FIXTURES

CROSS-REFERENCE TO RELATED APPLICATIONS

This application is a continuation of International Application No. PCT/CN2016/096444, filed on Aug. 23, 2016, which claims the benefit of Chinese Patent Application No. 201520693145.4, filed on Sep. 9, 2015, each incorporated by reference herein in their entirety.

BACKGROUND OF THE INVENTION

Within the field of indoor horticulture, it is commonly known that adjustable light fixtures offer many advantages, such as allowing horticulturists to customize the intensity and geometry of light radiation emitted from a light fixture to meet the needs of plants at different stages of growth, without adjusting the height at which the light fixture is installed, replacing the fixture, changing the lamp used or making other such changes.

Typically, a light fixture is installed above a planting tray of standard dimensions: 4 ft×4 ft, 4 ft×6 ft or 4 ft×8 ft. It is commonly known that plants require different intensities of light for optimal results at different phases of growth, creating the need for a light fixture capable of emitting a light beam of uniform intensity which can be easily adjusted to a plurality of selected geometries, which correspond to both the standard dimensions of commonly used planting trays and selected degrees of intensities commonly required for optimal results at different stages of plant growth.

In the prior art, adjustable light fixtures which comprise at least one arched, concave reflective surface have no end plates along the curved edges of the reflective sheet, thereby failing to reflect light emitted from the central light source toward the sides of the fixture not bounded by the arched sections of the reflective surface. Such arrangements fail to reflect substantial amounts of light radiation into the target area, resulting in a waste of electricity.

Another shortcoming not addressed in the prior art is the inability to adjust the geometry of the light beam emitted by a light fixture in a single step and without the use of additional tools. Previous art requires multiple steps or the use of tools to adjust the geometry of the emitted light beam. Due to the complexity of the adjustments, horticulturists must spend substantial time and exert substantial effort to carry out the adjustments, which in most practical growing situations must be carried out for a large quantity of light fixtures. In addition, the need for the precise use of hand tools requires a sufficiently high level of visibility in the field. This necessitates the installation and operation of auxiliary lighting sources in the work space, which necessarily incurs additional costs.

In the prior art, light fixtures with concave reflective surfaces substantially surrounding the light source on five sides are built with substantially heavy frames or housings to support the light source and the reflective surfaces. The weight of the fixtures increases the difficulty of installation and necessitates that the structure or architecture supporting the fixture is able to support a heavy object. A rigid housing comprising a latitudinal surface above the light source and rigid, longitudinal sides surrounding the light source limits the degree to which reflective surfaces installed within the concave structure can be easily adjusted, and the necessary complexity and heaviness of the fixtures increase manufacturing and shipping costs.

In the prior art, adjusting the concavity of fixtures with arched reflective surfaces requires changing the degree of curvature of the arched surfaces, which may result in suboptimal geometries of the reflected light beam or suboptimal uniformity of the radiation intensity of the light beam.

SUMMARY OF THE INVENTION

The present invention seeks to provide an adjustable reflecting device which substantially overcomes or at least ameliorates the disadvantages of the prior art.

Accordingly, it is an object of the invention to provide a light fixture having a concave reflective sheet with movable end plates that maybe adjustably retained to the fixture's minimal frame in different selected positions, whereby the movable end plates retain the reflective sheet in selected degrees of concavity, thereby enabling the light beam, which is created by reflection of light emitted from a light source positioned substantially centrally within the fixture and substantially in parallel to the apex of the concave reflective sheet, to be of adjustable geometry and intensity.

Another object of the invention is to provide a light fixture which can be easily adjusted without the use of tools and in environments with low visibility to emit a light beam that is adjustable between a plurality of selected geometries. In an environment with relatively low visibility, a horticulturist can make the adjustments to the device by listening for a clicking sound or by taking note of physical reverberations when the adjustable retention mechanisms are engaged in different selected positions.

Still another object of the invention is to provide light fixture which can be easily adjusted to emit a light beam that is adjustable between a plurality of selected geometries, which, when the fixture is installed at a height commonly allowed by ceilings or grow-tent hangers of approximately standard height, correspond to the standard dimensions of planting trays used in the indoor horticulture industry, thereby allowing horticulturists to provide uniform light radiation of relatively low intensity to 4 ft×8 ft or 4 ft×6 ft trays of plants during the early and vegetative phases of growth, and then to re-adjust the light beam to a higher intensity of radiation to be projected onto 4 ft×4 ft trays during the plants' flowering phase of growth. These adjustable geometries of the light beam allow horticulturist to re-arrange their plants in grow trays beneath the fixture to minimize the amount of fixtures needed during early and vegetative growth phases and to customize the light beam's radiation intensity to different growing needs, which allows savings in electricity and equipment costs.

Still another object of the invention is to provide a method of constructing a reflective surface for application in an adjustable light fixture from a single substantially rectangular sheet of material which is reflective on at least one side, thereby simplifying manufacturing and installation processes, as well as reducing the amount of material required by eliminating the potential need for overlapping sheets in cases in which more than one sheet are attached together.

Still another object of the invention is to provide a method of constructing a light fixture with reflective surfaces substantially surrounding a light source on five sides in a concave arrangement that does not require a rigid housing or a substantially heavy frame, thereby minimizing manufacturing and shipping costs, while simultaneously optimizing the fixture's reflectivity and range of adjustable positions. The lack of a rigid housing in the present invention allows it to be manufactured using relatively little material and at a correspondingly low total weight, which subsequently allows the fixture to be supported by relatively weak support structures, thereby increasing its versatility for installation in different situations.

BRIEF DESCRIPTION OF THE DRAWINGS

The present invention will be more fully understood from the following description of a preferred but non-limiting embodiment thereof, described in connection with the accompanying drawings, wherein:

FIG. 8A is a cross-sectional view of a ball catch unit retained in a higher catch position;

FIG. 8C is cross-sectional view of a ball catch unit retained in a lower catch position;

FIGS. 10A-10C are perspective views of FIG. 1 in use when the adjustable reflector arrangement is retained the catch positions illustrated in FIG. 8A-FIG. 8C.

DETAILED DESCRIPTION OF THE INVENTION

Figure 1:
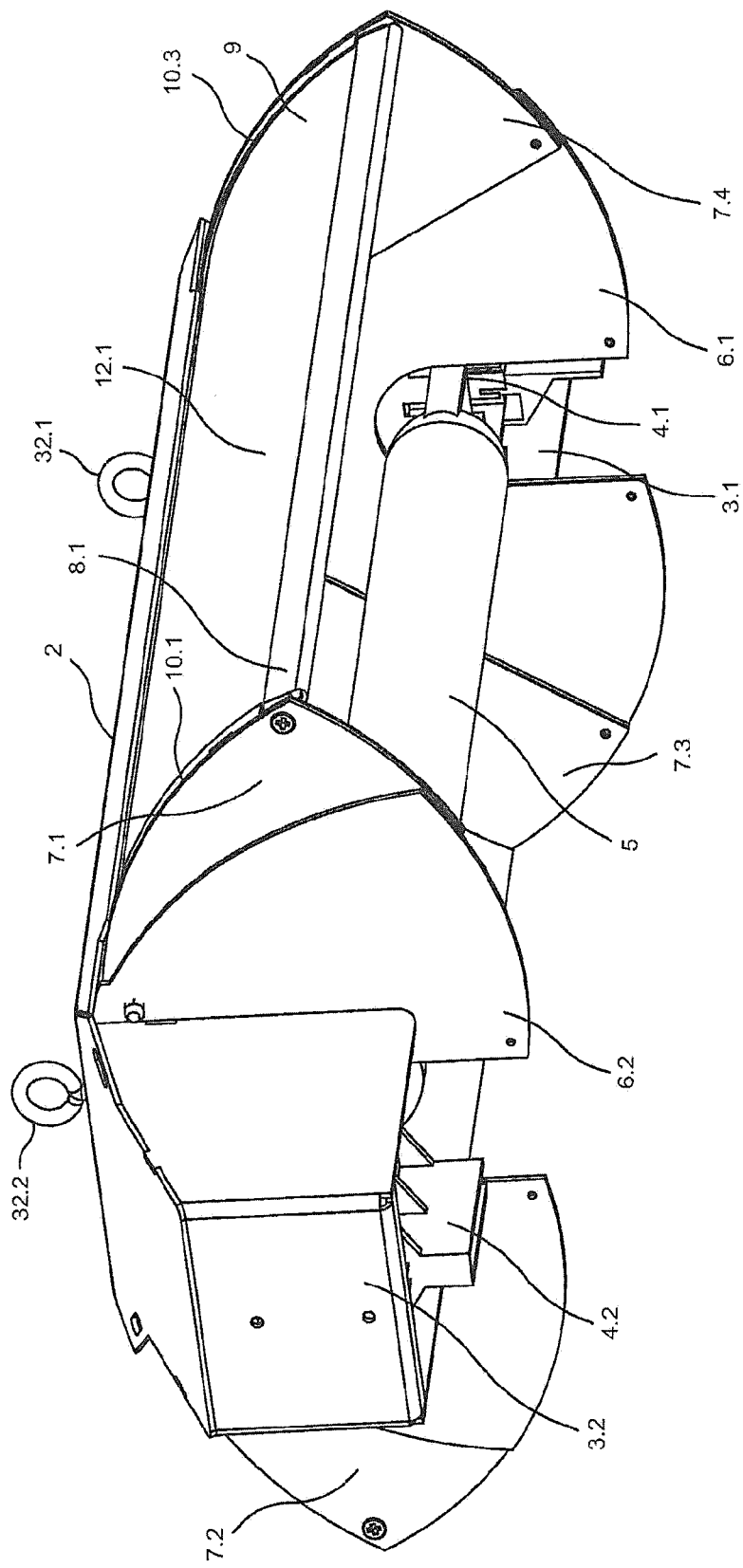
FIG. 1 shows a reflector arrangement installed on a light fixture according to an exemplary embodiment.

Exemplary embodiments of a lighting system according to the present invention are presented with those components of primary interest relative to the inventive apparatus and process. For purposes of clarity, many of the mechanical and electrical elements for attaching and assembling the various components of the lighting system are not illustrated in the drawings. A lighting control panel which provides for the electrical control of an illumination bulb used in the present lighting system is not shown in most of the drawings as such bulbs and their operation are well known within the industry. These omitted elements may take on any of a number of known forms which may be readily realized by one of normal skill in the art having knowledge of the information concerning the mode of operation of the system and of the various components and related processes utilized for horticulture lighting systems as provided herein.

As used herein, the term "light fixture" refers to a system capable of creation of a flux of radiation by activation of a lighting bulb. The terms "lighting", "radiation" and "illumination" all refer to electromagnetic energy having a wavelength in the infrared, visible and ultraviolet range. Lighting bulbs for use in the present invention are those having metal halide, high pressure sodium radiation sources and combinations thereof.

As used in this application, "up", "down", "upper", "lower", "beneath", and "above" are intended to facilitate the description of the adjustable reflector assembly. Such terms are merely illustrative of the reflector assembly and do not limit the reflector assembly to any specific orientation.

As used herein the term concave reflector is to have its broadest meaning, including arched sections of any curve that can be desirable as well as any number of straight sections, especially folded sections between the apex of the convex reflector and the light source which prevent radiation from being reflected off the reflector back at the light source and increase the uniformity of the reflected light.

Figure 2:
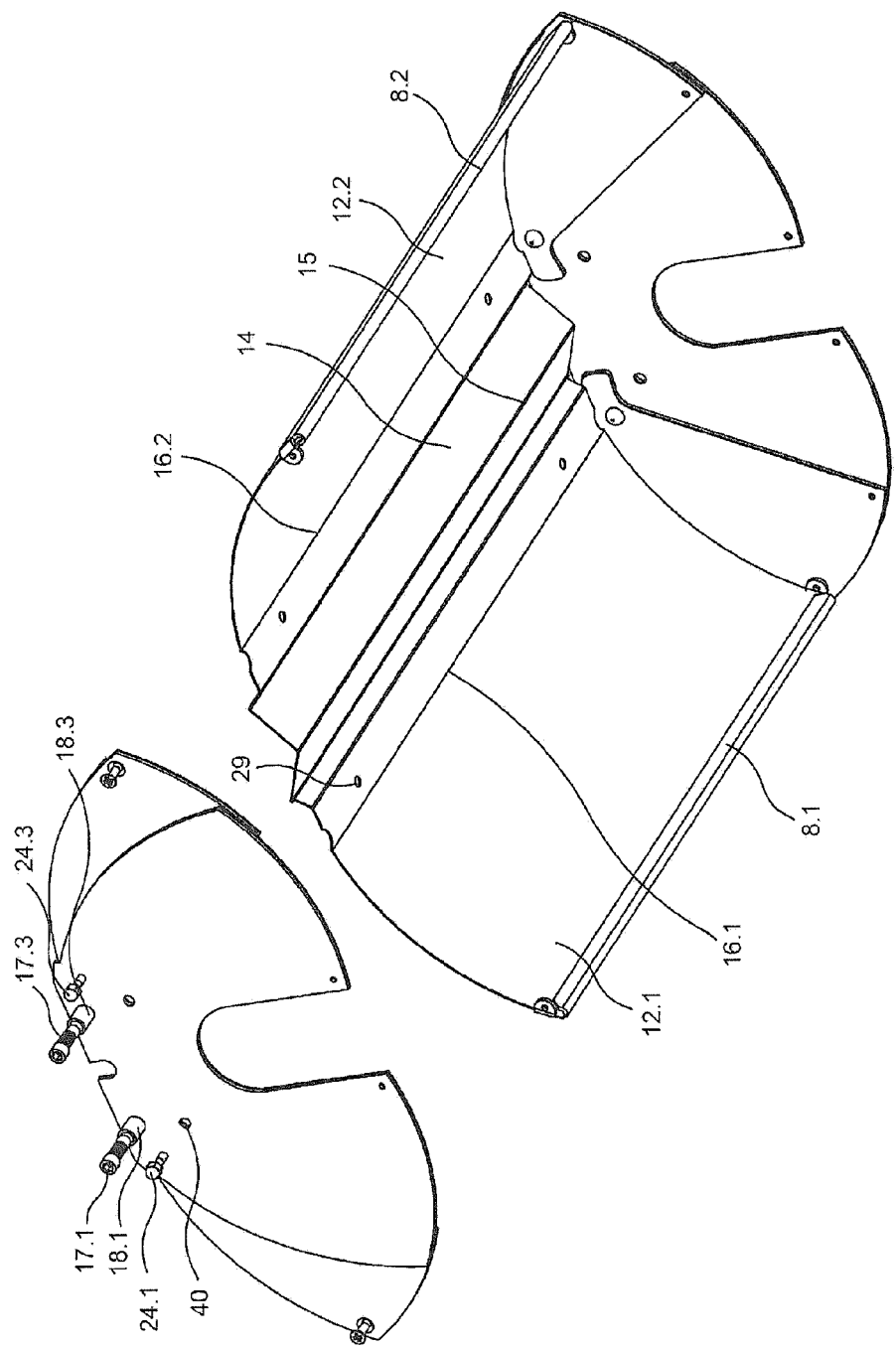
FIG. 2 is a perspective view of the reflector arrangement of FIG. 1.
Figure 3:
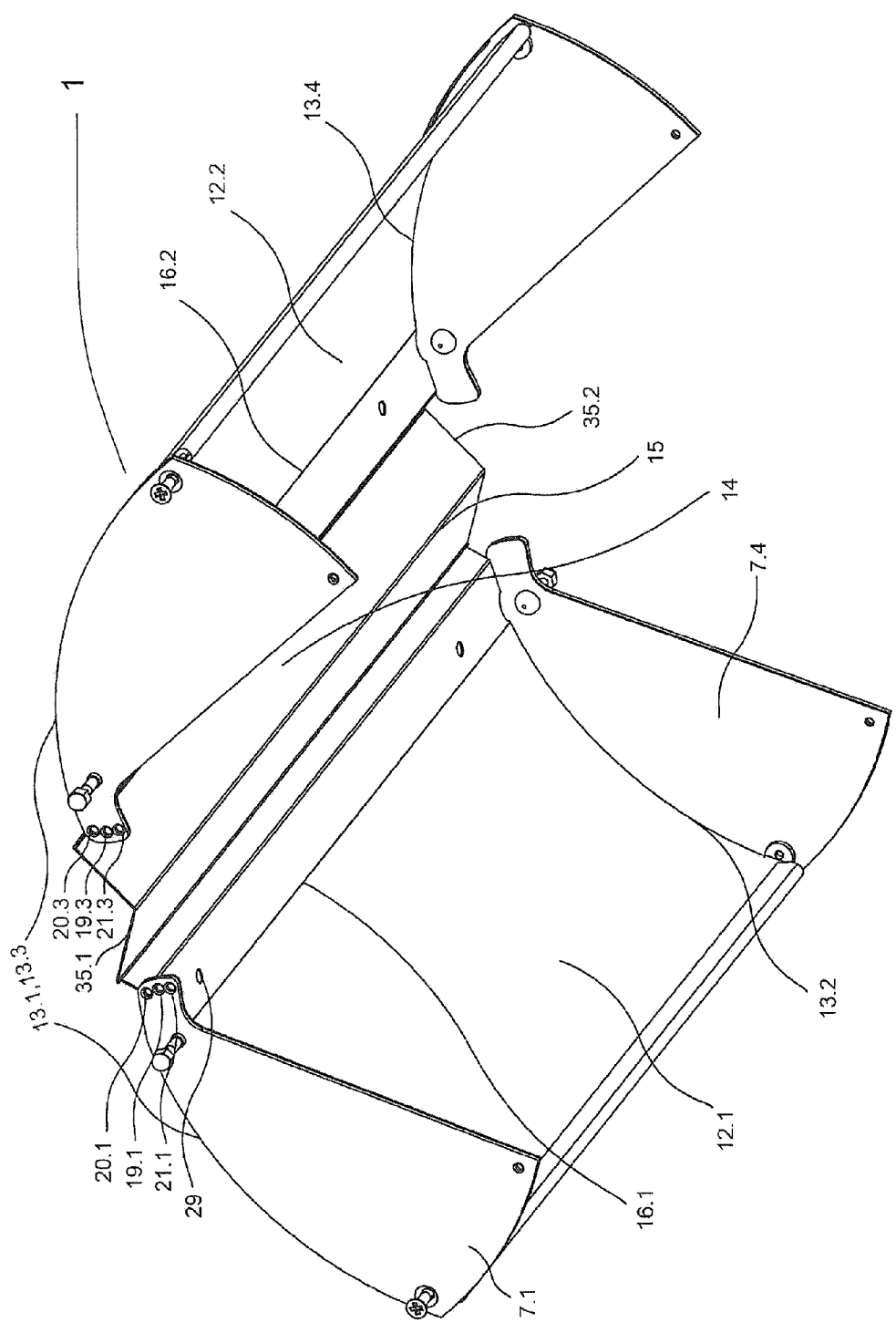
FIG. 3 is an enlarged perspective view of a reflector unit according to an exemplary embodiment.

Referring to FIG. 1 to FIG. 3, the exemplary embodiment of a winged adjustable reflector unit 1 comprises a substantially rectangular back plate 2. The winged adjustable reflector unit 1 further comprises two lamp socket housings (3.1 and 3.2), two lamp sockets (4.1 and 4.2), and two fixed end plates (6.1 and 6.2) placed on two ends of the back plate 2. In one embodiment, each fixed end plate may be attached to one end of the black plate 2. The winged adjustable reflector unit 1 further comprises movable end plates (such as movable end plates 7.1, 7.2, 7.3, and 7.4 as shown in FIG. 1). FIG. 1 also shows resilient reflective sheet 9 and reflective sheet wings (12.1 and 12.2). Each reflective sheet wing (12.1 and 12.2) may have two wing edges. For instance, as shown in FIG. 3, reflective sheet wing 12.1 may comprise wing edges 13.1 and 13.2. Reflective sheet wing 12.2 may comprise wing edges 13.3 and 13.4. Each movable end plate (7.1, 7.2, 7.3, and 7.4) may be placed along a wing edge of a corresponding reflective sheet wing (12.1 or 12.2). For instance, the movable end plate 7.1 may be placed along wing edge 13.1 of the reflective sheet wing 12.1. In FIG. 2, 29 refers to an oblong bolt hole.

Figure 4:
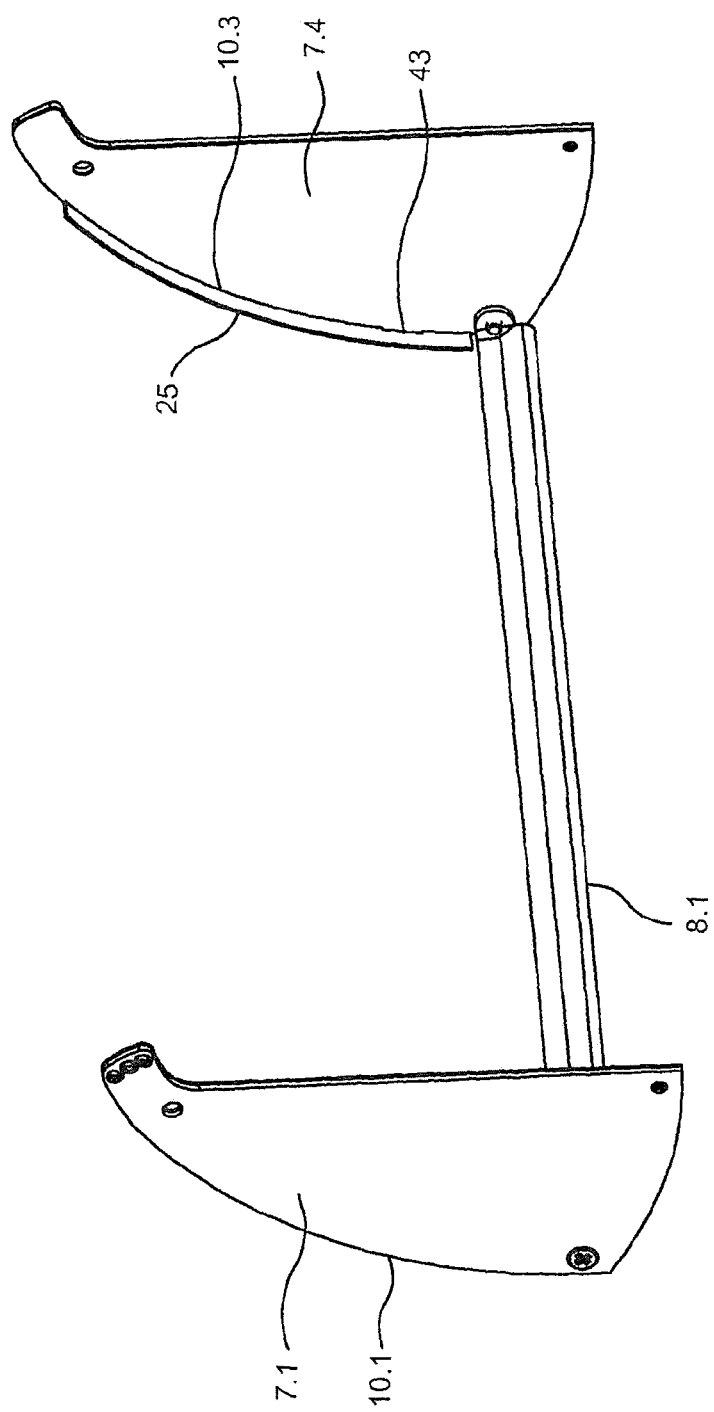
FIG. 4 is a perspective view of a pair of wing frame unit according to an exemplary embodiment.

With references to FIG. 1 and FIG. 4, the curvature of the reflective sheet wings may be determined by curvature of curved edges of the movable end plates. For instance, the curvature of the reflective sheet wings 12.1 may be determined by curvature of curved edges 10.1 and 10.3 of the movable end plates 7.1 and 7.4. As illustrated in FIG. 4, each movable end plate, such as 7.4, may have a support strip 25 folded at a 90 degree angle toward the corresponding reflective sheet wing 12.1. With references to FIGS. 1-4 and FIGS. 6-7, the support strip 25 may be welded to the corresponding reflective sheet wings 12.1 and 12.2. The support strip 25 may be reinforced by a wing tab 42 protruding from the wing edge of the reflective sheet wing 12.1 and positioned to securely interlock with a tab slot 43, as shown in FIG. 6.

Figure 5:
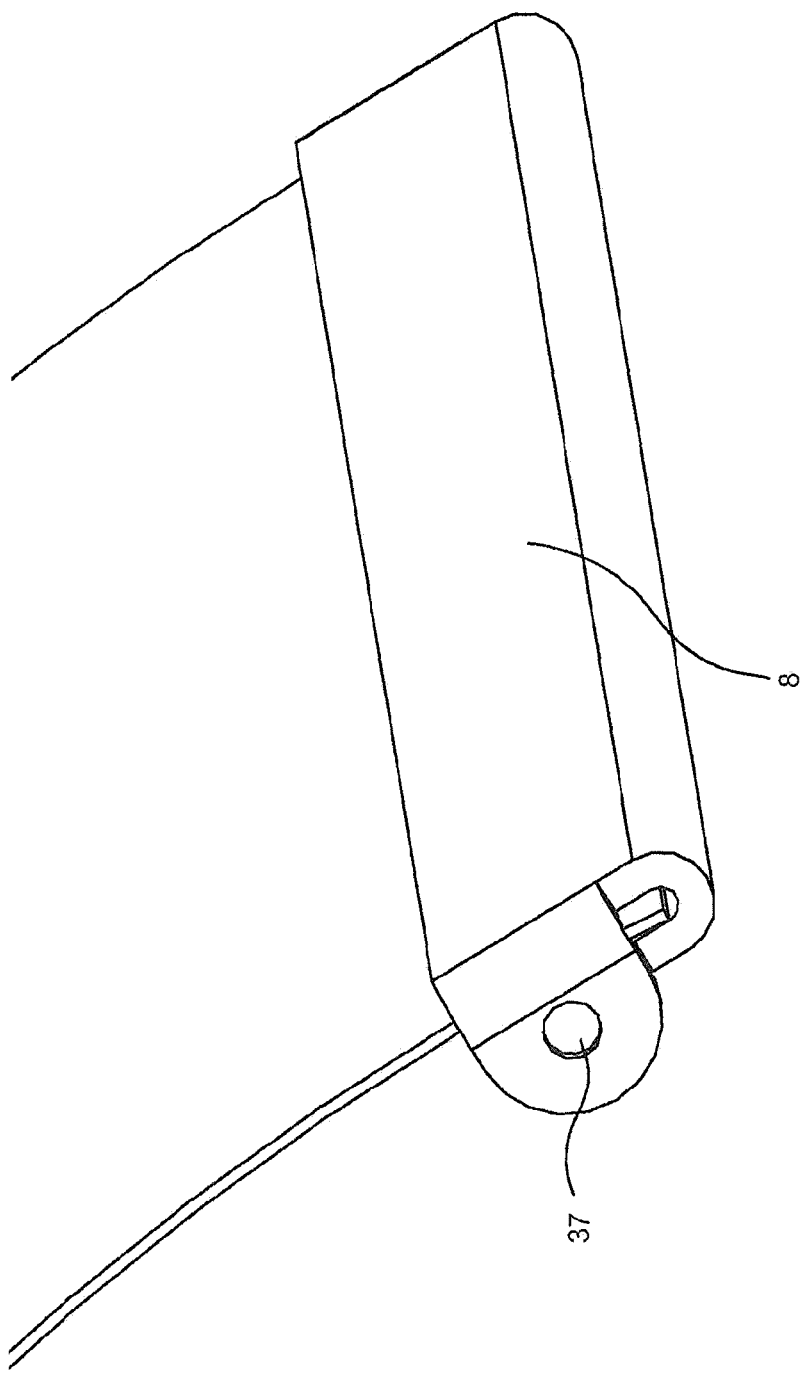
FIG. 5 is a cross-sectional view of a connector rod attached to a reflective sheet wing.

FIG. 5 is a cross-sectional view of a connector rod 8 attached to a reflective sheet wing 12. The connector rod 8 may have a securing hole 37 on one end through which a securing means may be installed thus to secure a movable end plate to the fixed end plate. The securing means may be a screw, a bolt or any other things that may be used to secure the movable end plate to the fixed end plate.

Figure 6:
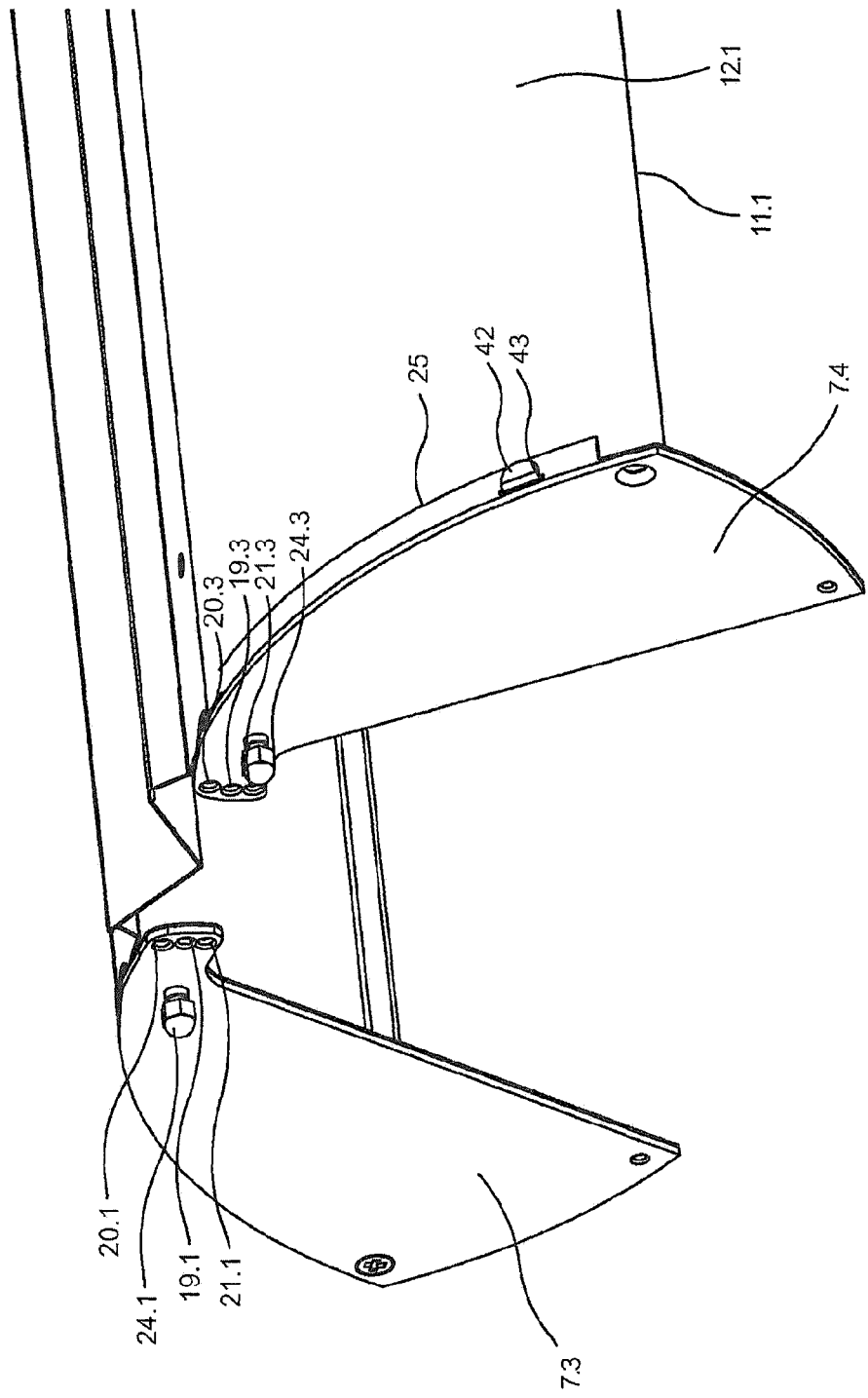
FIG. 6 is a cross-sectional view of a reflective sheet wing having a free edge.

FIG. 6 shows that each reflective sheet wing may comprise a free edge. For instance, the reflective sheet wing 12.1 may comprise a free edge 11.1. The rigidity of the free edge may be reinforced by a connector rod. For instance, with additional reference to FIG. 2, a connector rod 8.1 may be configured to reinforce the rigidity of the free edge of the reflective sheet wing 12.1 and a connector rod 8.2 configured to reinforce the rigidity of the free edge of the reflective sheet wing 12.2. Each connector rod (8.1 and 8.2) may connect two movable end plates. For instance, with additional references to FIG. 1 and FIG. 4, the connector rod 8.1 may connect two movable end plates 7.1 and 7.4.

Figure 7:
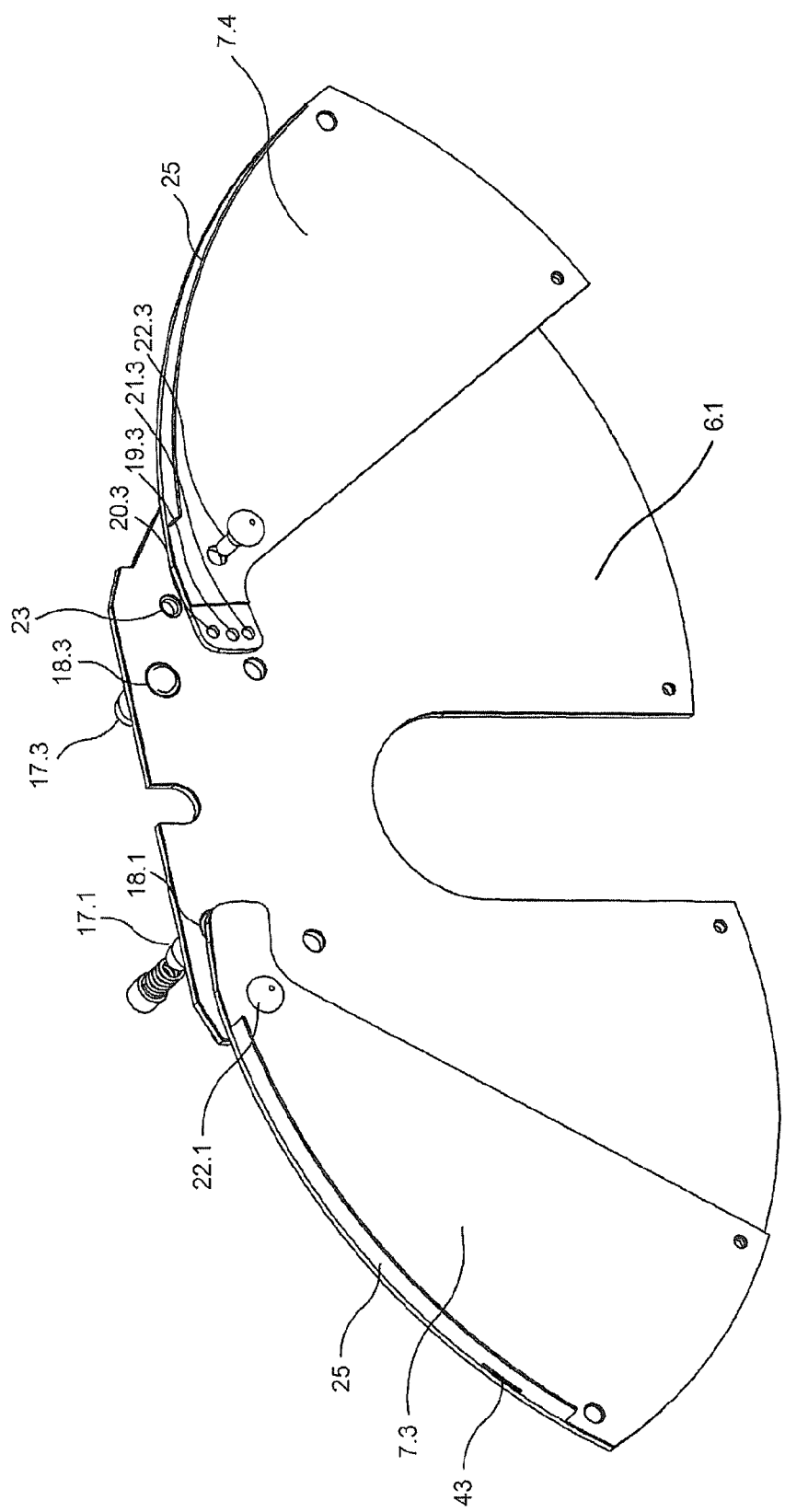
FIG. 7 is a cross-sectional view of a movable end plate adjustably attached to a fixed end plate.

FIG. 7 is a cross-sectional view of a movable end plate adjustably attached to a fixed end plate by retaining means. Retaining means may attach the movable end plates and the fixed end plates together strongly enough to resist the force of the resilient reflective sheet's natural resilience or the force of gravity acting on the reflective sheet wings. The retaining means may comprise a hinge pin and a hinge pin nut. As shown in FIGS. 6-7, the hinge pins (22.1 and 22.3) and hinge pin nuts (24.1 and 24.3) may attach respective movable end plates (7.3 and 7.4) to the corresponding fixed end plates 6.1 in a loose manner to allow radial rotation around respective hinge pins 22.1 and 22.3. 23 refers to a hinge pin hole. The movable end plates may be disengaged and reengaged in a selected position using a relatively small amount of force, such that a person having average strength and skill can easily change the fixture's degree of concavity with little exertion and without the use of any tools. Each reflective sheet wing of the light fixture may also be flexed independently of the other, enabling horticulturists to adapt use to confined spaces, such as installation in close proximity to a wall on one side, wherein it is advantageous to reflect more light away from the wall on one side while covering a relatively large area on the non-walled side.

Fastening mechanism may fasten the movable end plates to the fixed end plate. The fastening mechanism may comprise ball bearing catches and spring-loaded ball bearing unit. As illustrated in FIG. 7, ball bearing catches 19.3, 20.3, and 21.3 are built into one side of the movable end plate. The movable end plates 7.3 and 7.4 are attached to the corresponding fixed end plate 6.1 in an arrangement allowing the movable end plates 7.3 and 7.4 to slightly radially rotate around the hinge pins 22.1 and 22.3, in such a way as to adjustably engage with a respective spring-loaded ball bearing unit 17.1 and 17.3 installed in the fixed end plates 6.1 through the respective ball bearing unit hole 18.1, 18.3, wherein the spring-loaded ball bearing units 17.1 and 17.3 face toward the corresponding movable end plates 7.3 and 7.4.

With additional reference to FIGS. 6-7, the ball bearing catches 19.1 and 19.3, 20.1 and 20.3, 21.1 and 21.3 on the outward facing surfaces of the movable end plates 7.3 and 7.4 may adjustably engage with the respective spring-loaded ball bearing units 17.1 and 17.3, installed on the inward facing surfaces of the corresponding fixed end plates 6.1 in a variety of selected positions.

In exemplary embodiments, three selected positions allow the light fixture to be opened to three different degrees of concavity. The geometries of the light beams emitted by these particular configurations roughly correspond to the three standard dimensions of plant trays (4 ft×4 ft, 4 ft×6 ft and 4 ft×8 ft), but the present invention can be easily adapted to include any number of adjustable positions which may be advantageous for growing situations.

Figure 8B:
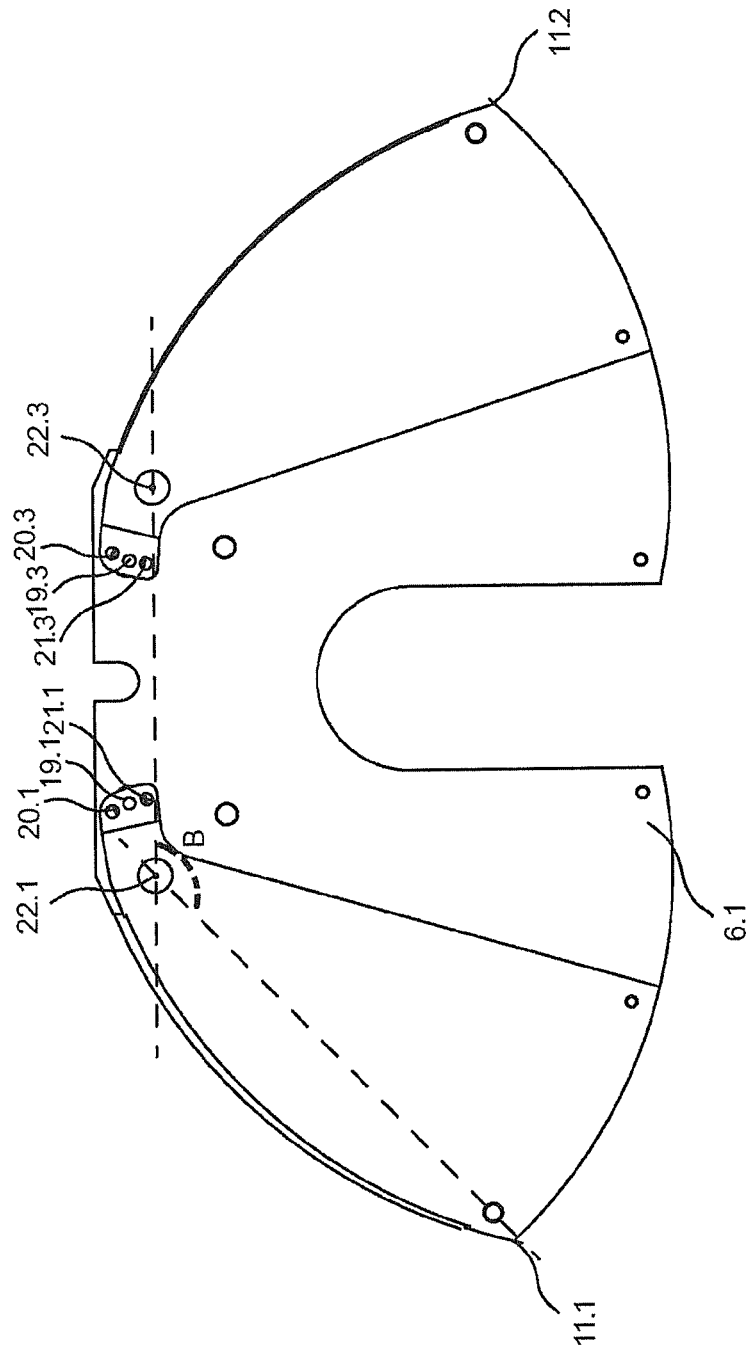
FIG. 8B is cross-sectional view of a ball catch unit retained in a middle catch position.

Each of the movable end plates 7.1, 7.2, 7.3, and 7.4 is adjustably attached to the corresponding fixed end plate 6.1 or 6.2 at a plurality of selected angles A, B, and C by using adjustable retainable means. As described above, the adjustable retainable means may comprise hinge pins and hinge pin nuts. The selected angles A, B, and C are illustrated in FIG. 8A, FIG. 8B, and FIG. 8C, respectively. By adjusting the installation angles, the degree of concavity of the resilient reflective sheet may be adjusted which may enable the lighting fixture to emit a light beam of selectable geometry. The movable end plates 7.1, 7.2, 7.3, and 7.4 may be placed along wing edge of the corresponding reflective sheet wing 12.1 or 12.2 in such ways that allow varying degrees of flexibility, securing the reflective sheet wing at a fixed angle or fixed degree of curvature for all or part of the wing edge, thereby allowing the curvature of the reflective sheet to be affected to a greater or lesser degree by the extent to which the fixture is flexed.

In use, the lighting fixture is generally suspended by using hanging eye bolts 32.1 and 32.2, as illustrated in FIG. 1, from the ceiling of the grow space or from a hanging bar or other such setup such that the light fixture emits a beam of light down onto the plants positioned below it. The adjustable reflector unit may also comprise adjustable fastening mechanism that adjustably fastens the movable end plates 7.1, 7.2, 7.3, and 7.4 to the corresponding fixed end plates 6.1 or 6.2.

The adjustable fastening mechanism that adjustably fastens the movable end plates 7.1, 7.2, 7.3, and 7.4 to the corresponding fixed end plates 6.1 or 6.2 may take any form, comprising ball catches, magnetic latches, adjustable latches, roller latches, touch latches, loft latches, bolt and hole mechanisms, hook and eye mechanisms, or any other mechanism that adjustably fastens the movable end plates 7.1, 7.2, 7.3, and 7.4 to the back plate 2 or any other fixed component of the lighting fixture. Adjustable fastening mechanisms may be manually adjusted between pre-determined positions by pushing, pulling or physically manipulating the two free edges of the reflective sheet together or apart. In other words, the adjustable fastening mechanisms may be adjusted without use of any tool. In use, the adjustable fastening mechanism is adjusted by pushing the two free edges of the reflective sheet together or apart without the use of any other tool and which makes an easily audible sound and tactile vibration when the fastener is engaged, thereby enabling the user to make adjustments in environments with little visibility.

Figure 9A:
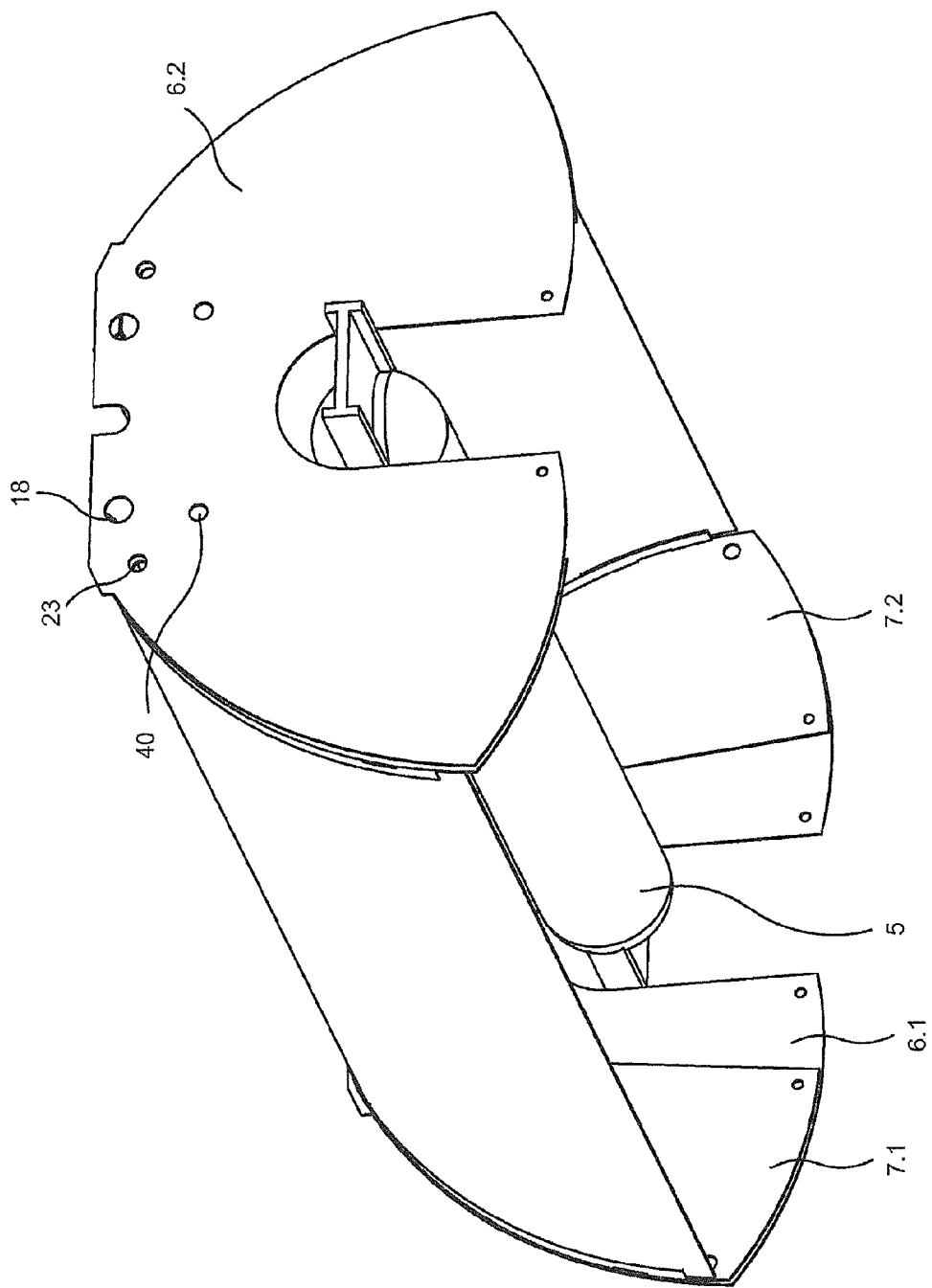
FIG. 9A is a perspective view of FIG. 1 in use when the reflector arrangement is retained in the higher catch position, as illustrated in FIG. 8A.
Figure 10A:
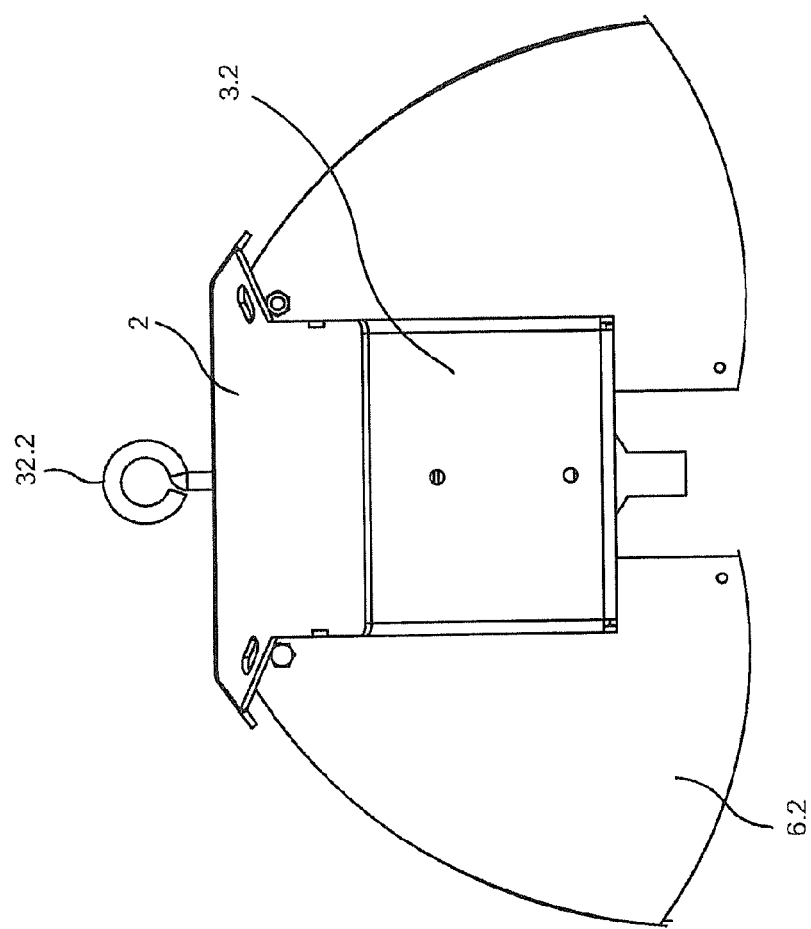
Figure 11A:
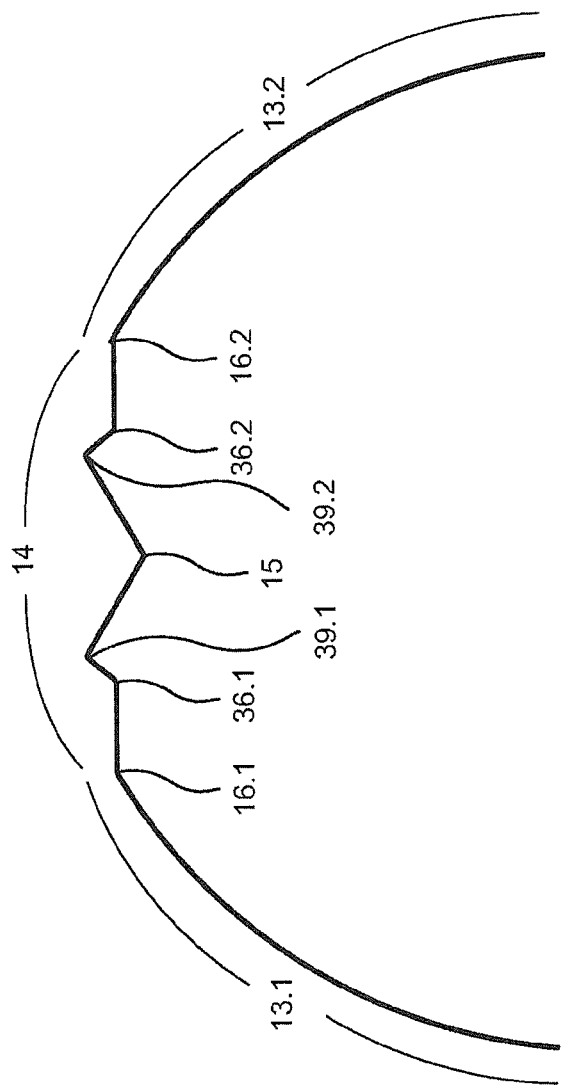
FIGS. 11A-11C are cross sectional views of the concave reflector sheet in use when retained in corresponding catch positions as illustrated in FIG. 8A-FIG. 8C.

With references to FIG. 7 and FIG. 8A, the adjustable fastening mechanism may comprise spring-loaded ball bearing unit and ball bearing catch. For instance, engagement of the spring-loaded ball bearing unit 17.1 and 17.3 with the lower position ball bearing catch 21.1 and 21.3 adjustably fastens the movable end plate 7.3 and 7.4 to the corresponding fixed end plate 6.1 such that the selected angle A, which is formed between a line from the hinge pin 22.1 to 22.3 and the corresponding free edge of the reflective sheet wing is relatively acute compared to other selected positions. The configuration corresponds to a relatively closed arrangement of the resilient reflective sheet, as illustrated in FIG. 11A, which causes light emitted from double ended lamp 5 incident on the ridged central section 14 and arched reflective sheet wings to be reflected uniformly across the geometry of a light beam that approximately corresponds to a 4 ft×4 ft plant tray, as can be inferred from FIG. 9A and FIG. 10A.

Similarly, with references to FIG. 7 and FIG. 8B, engagement of the spring-loaded ball bearing unit 17.1 and 17.3 with the middle position ball bearing catch 19.1 and 19.3 adjustably fastens the movable end plate 7.3 and 7.4 to the corresponding fixed end plate 6.1 such that the selected angle B, which is formed between a line from the hinge pin 22.1 to 22.3 and the corresponding free edge of the reflective sheet wing is relatively acute compared to selected angle B.

Figure 9B:
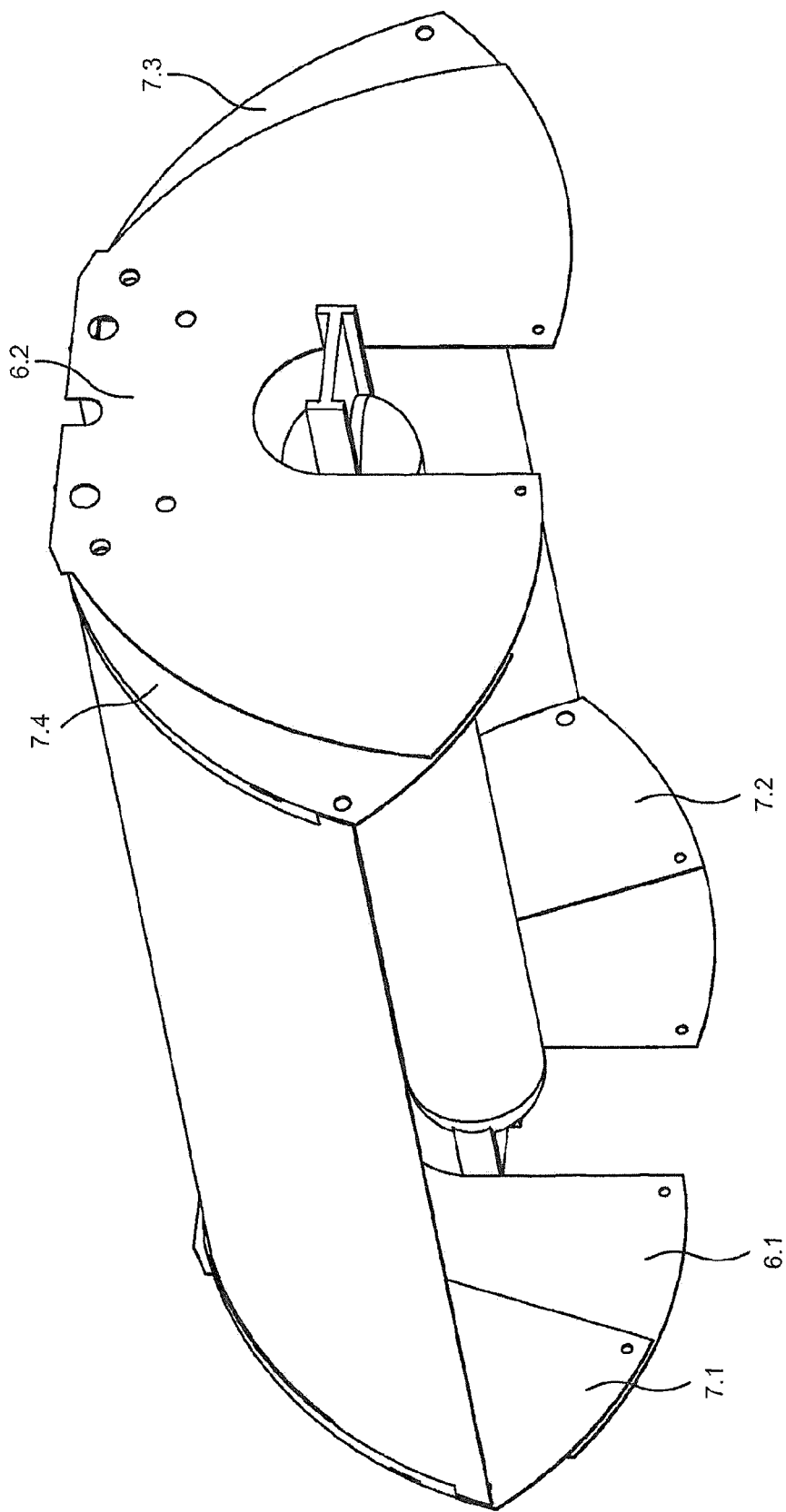
FIG. 9B is a perspective view of FIG. 1 in use when the reflector arrangement is retained in the middle catch position, as illustrated in FIG. 8B.
Figure 11B:
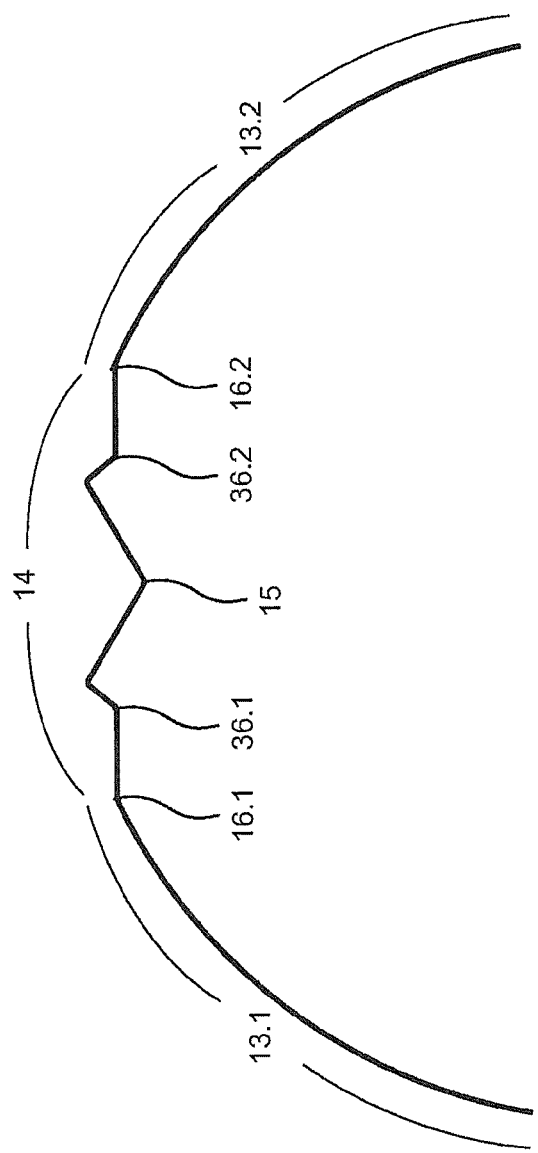

The configuration corresponds to a relatively open arrangement of the resilient reflective sheet, as illustrated in FIG. 11B, which causes light emitted from double ended lamp, not shown in FIG. 11B, incident on the ridged central section 14 and arched reflective sheet wings 12.1 and 12.2 to be reflected uniformly across the geometry of a light beam that approximately corresponds to a 4 ft×6 ft plant tray, as can be inferred from FIG. 9B and FIG. 10B.

Figure 9C:
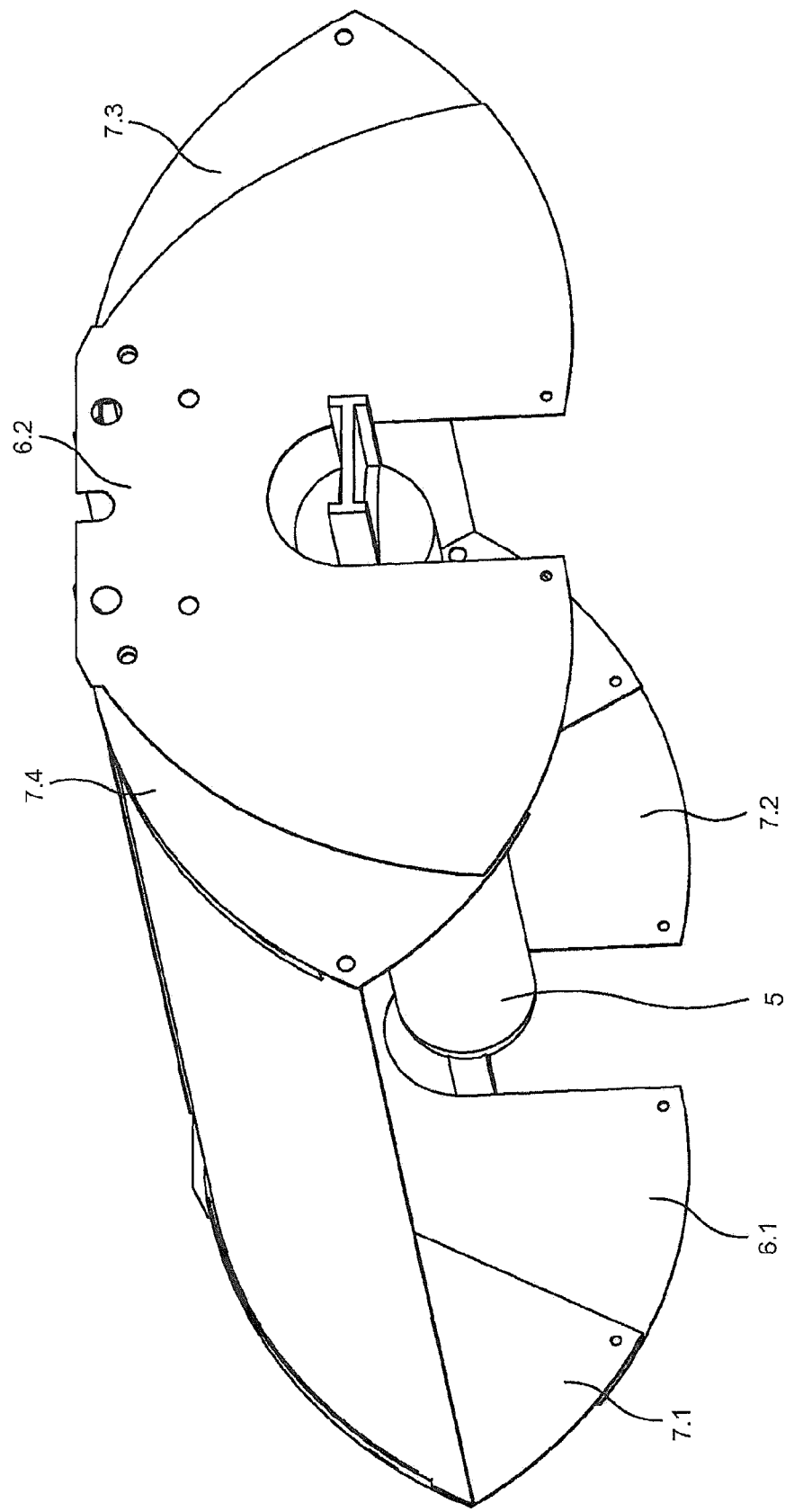
FIG. 9C is a perspective view of FIG. 1 in use when the reflector arrangement is retained in the lower catch position, as illustrated in FIG. 8C.
Figure 10C:
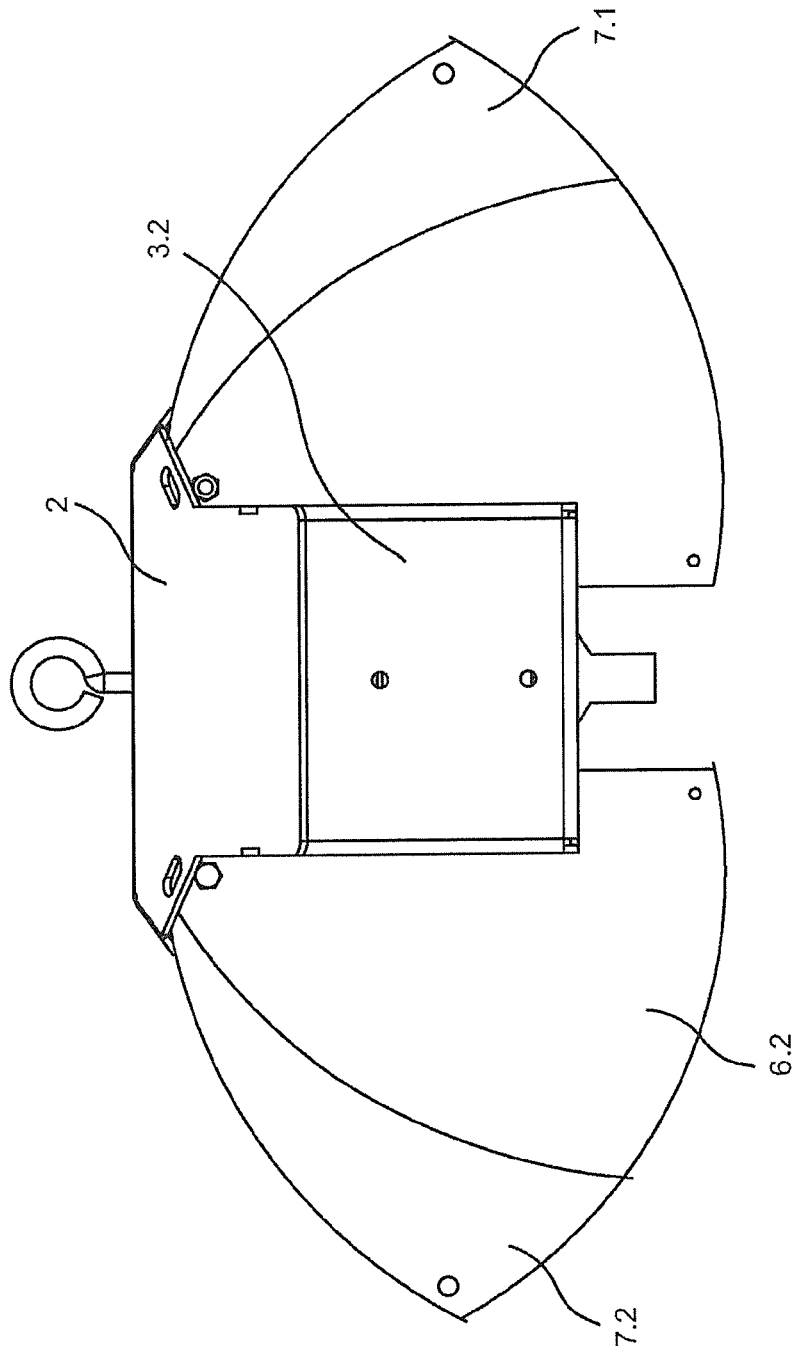

Similarly, with references to FIG. 7 and FIG. 8C, engagement of spring-loaded ball bearing unit 17.1 and 17.3 with the higher position ball bearing catch 20.1 and 20.3 results in the most obtuse selected angle C, which corresponds to the most open configuration of the light fixture, as illustrated in FIG. 9C and FIG. 10C.

Figure 11C:
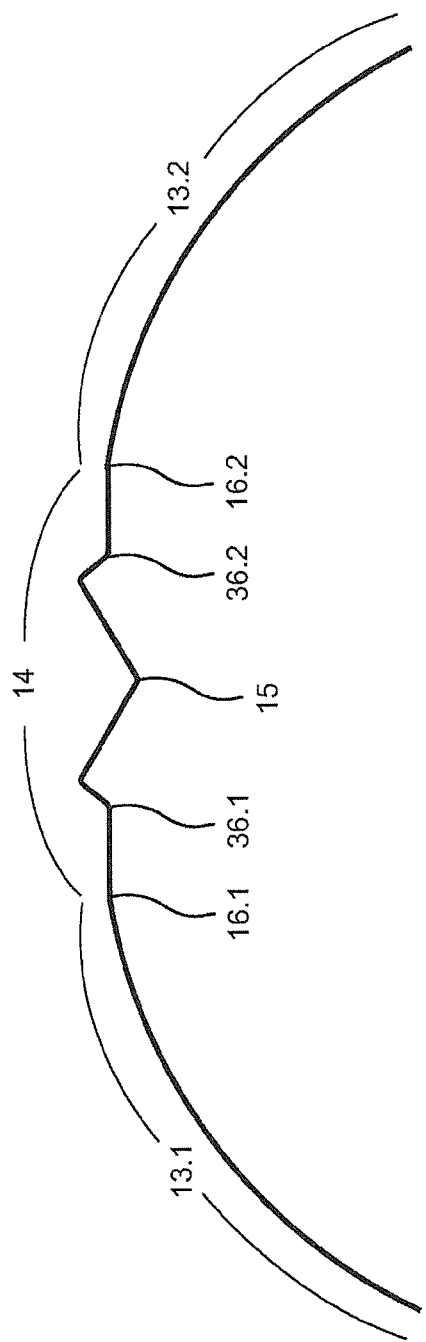

FIGS. 11A-11C are cross sectional views of the concave reflector sheet in use when retained in corresponding catch positions as illustrated in FIG. 8A, FIG. 8B, and FIG. 8C. The resilient reflective sheet is folded and flexed to create exemplary arrangements of reflective surfaces. The exemplary arrangements may include any combination of flat, ridged and curved sections. In exemplary arrangements, as illustrated in of FIG. 11A to FIG. 11C, the resilient reflective sheet is folded to feature two symmetrical curved reflective sheet wings (not completely shown), which radially rotate around two parallel pivot axes. The pivot axis is defined by the position of corresponding hinge pins, as described above, and which roughly corresponds to hinge folds 16.1 and 16.2 on the resilient reflective sheet. Additional folds are made parallel to the hinge folds 16.1 and 16.2 in the central section 14 of the resilient reflective sheet form a central ridge 15, which prevents light emitted from the double-ended lamp from being reflected directly back at the double-ended lamp 5, as shown in FIGS. 9A-9C. A number of auxiliary ridges 36.1 and 36.2, as shown in FIGS. 11A-11C are on both sides of the central ridge 15, which serve the purpose of diffusing the light radiation reflected by the fixture in order to emit a light beam of substantially uniform radiation across its geometry. A peak is formed between the central ridge 15 and an auxiliary ridge. For instance, as shown in FIG. 11A, peak 39.1 is formed between the central ridge 15 and the auxiliary ridge 36.1. Peak 39.2 is formed between the central ridge 15 and the auxiliary ridge 36.2.

The invention claimed is:

1. A lamp reflector with a degree of concavity, comprising:
    a resilient reflective sheet having at least one reflective surface, wherein the resilient reflective sheet is configured to form one or more reflective sheet wings, and the resilient reflective sheet has one or more folds serving as one or more pivot axes;
    at least one fixed end plate placed on at least one end of the lamp reflector, wherein each of the at least one fixed end plate comprises inward facing surfaces and at least two spring-loaded ball bearing units installed on the inward facing surfaces;
    an adjustable fastening mechanism configured to form at least two selected positions, wherein the adjustable fastening mechanism includes at least two ball bearing catches formed on an outward facing surface of the each of the movable end plate, wherein each of the at least two spring-loaded ball bearing units engages with one of the at least two ball bearing catches to obtain one of the at least two selected positions, wherein the degree of concavity of the resilient reflective sheet is adjustable, thereby enabling a lighting fixture to emit a light beam of a selectable geometry by adjusting between the at least two selected positions; and
    at least one movable end plate, wherein each of the at least one movable end plate is attached to one of the at least one fixed end plate by an adjustable retaining means in a loose manner, wherein the adjustable retaining means comprises a hinge pin and a hinge pin nut, thereby allowing the each of the at least one movable end plate to radially rotate with respect to the adjustable retaining means, wherein each of the at least one movable end plate is also attached to a portion of a corresponding wing edge of the reflective sheet wing, and positioned perpendicular to the reflective sheet wing, which allows the reflective sheet wing to be manually adjusted radially around the pivot axes to form different angles with respect to the central section.

2. The lamp reflector as claimed in claim 1, wherein the resilient reflective sheet is folded from a single sheet of a resilient, reflective material, having at least one sheet-bifurcating fold, parallel to the pivot axes, forming at least one peak, wherein the resilient reflective sheet forms the one or more reflective sheet wings and a central section connecting the one or more reflective sheet wings, wherein the central section has one or more peaks pointing toward an interior of the resilient reflective sheet in an M-shaped arrangement.

3. The lamp reflector as claimed in claim 1, wherein the reflector comprises four movable end plates.

4. The lamp reflector as claimed in claim 1, wherein each movable end plate is attached to the reflective sheet wing along a curved seam, wherein adjustable fastening mechanisms are radially positioned, and each adjustable fastening mechanism connects each movable end plate to opposing edges of the reflective sheet and restrains the reflective sheet wing of the resilient reflective sheet in a fixed position, forming a concave structure, which allows the one or more reflective sheet wings to be manually adjusted radially around the pivot axes to form different angles with respect to the central section, thereby changing the degree of concavity of the resilient reflective sheet without changing a degree of curvature of the one or more reflective sheet wings.

5. The lamp reflector as claimed in claim 1, wherein the resilient reflective sheet comprises one or more oblong bolt holes located in the central section of the resilient reflective sheet close to the pivot axes, wherein the one or more oblong bolt holes secure the one or more folds to a frame which allows the resilient reflective sheet to shift slightly, in a direction perpendicular to the pivot axes along the one or more oblong bolt holes, which allows the angles and heights of the peaks in the central section to change slightly as the resilient reflective sheet's degree of concavity changes.

6. The lamp reflector as claimed in claim 1, wherein the adjustable fastening mechanisms comprises at least one of ball catches, magnetic latches, adjustable latches, roller latches, touch latches, loft latches, bolt and hole mechanisms, hook and eye mechanisms, and any other mechanism that adjustably fastens the movable end plates to the fixed end plate.

7. The lamp reflector as claimed in claim 1, wherein the adjustable fastening mechanisms is configured to be adjusted between pre-determined positions by physically manipulating the two wing edges of the resilient reflective sheet.

8. A luminaire comprising a lamp holder and the lamp reflector as claimed in claim 1.

9. The luminaire as claimed in claim 8, wherein the lamp holder is adjustably mounted to permit the adjustment of the distance between the lamp holder and the lamp reflector.

10. A luminaire comprising:
an adjustable reflective sheet, wherein the adjustable reflective sheet has one or more folds serving as one or more pivot axes, forms two reflective sheet wings and a central section connecting the two reflective sheet wings, and is configured to be radially adjusted to a concave structure;
one or more movable end plates, each of which is perpendicular to one of the reflective sheet wing;
adjustable retaining means, wherein the adjustable retaining means are attached to an outside surface of the reflective sheet wings for adjustably retaining the one or more movable end plates in a plurality of selected positions relative to a frame;
a plurality of pivot pins, being aligned with the pivot axes, wherein the adjustable retaining means are configured to pivot around pivot pins and retain the reflective sheet wings at various fixed positions in relation to the frame corresponds to varied degrees of concavity of the adjustable reflective sheet
a plurality of radially positioned fastening mechanisms, wherein each movable end plate is attached to one of the reflective sheet wings along a curved seam, wherein each radially positioned fastening mechanisms connects each movable end plate to opposing edges of the reflective sheet wing and restrains the reflective sheet wing in a fixed position, forming a concave structure, thereby allowing the reflective sheet wing to be manually adjusted radially around the pivot axes to form different angles with the central section, thereby changing the degree of concavity of the adjustable reflective sheet without changing a degree of curvature of the reflective sheet wings; and
an elongate light source configured to emit a beam of light of an adjustable beam geometry, wherein the elongate light source is arranged adjacent to the reflective sheet wings and is spaced apart from and substantially parallel to the pivot axes, which allows the beam of light to be substantially equally incident on each of the reflective sheet wings and the central section of the adjustable reflective sheet;
wherein the radially positioned fastening mechanisms are installed on outward facing sides of the movable end plates, thereby allowing the movable end plates to be adjustably fastened to the frame or other component fixed to the frame at different set positions, and to be adjustably retained by adjustable retaining means between the movable end plates and any part of the frame or other component fixed to the frame, wherein the degree of concavity of the adjustable reflective sheet is adjustable by adjusting a position at which the adjustable retaining means are fastened to the frame, thereby adjusting the adjustable beam geometry to be emitted from the luminaire at each position in which the movable end plates are adjustably fastened
wherein the degree of concavity of the adjustable reflective sheet is adjustable by adjusting the position at which the adjustable retaining means are fastened to the frame, and the adjustable beam geometry is adjustable by adjusting the degree of concavity of the adjustable reflective sheet.

11. The luminaire as claimed in claim 10, wherein the adjustable reflective sheet comprises one or more oblong bolt holes located in the central section of the adjustable reflective sheet close to the pivot axes, wherein the one or more oblong blot holes secure the one or more folds to the frame, which allows the adjustable reflective sheet to shift slightly, in a direction perpendicular to the pivot axes along the oblong bolt holes, thereby allowing the angles and heights of the peaks in the central section to change slightly as the adjustable reflective sheet's degree of concavity changes.

12. The luminaire as claimed in claim 10, wherein the adjustable fastening mechanisms are configured to be adjusted between pre-determined positions by physically manipulating two free edges of the adjustable reflective sheet, wherein pre-determined positions correspond to different adjustable beam geometries to be emitted from the luminaire.

13. The luminaire as claimed in claim 10, wherein the reflective sheet wings are independently adjustable.

\* \* \* \* \*